Aug. 31, 1954     E. S. RUSSEY     2,687,928
TRANSMISSION IDLER GEAR CONSTRUCTION
Filed April 29, 1950
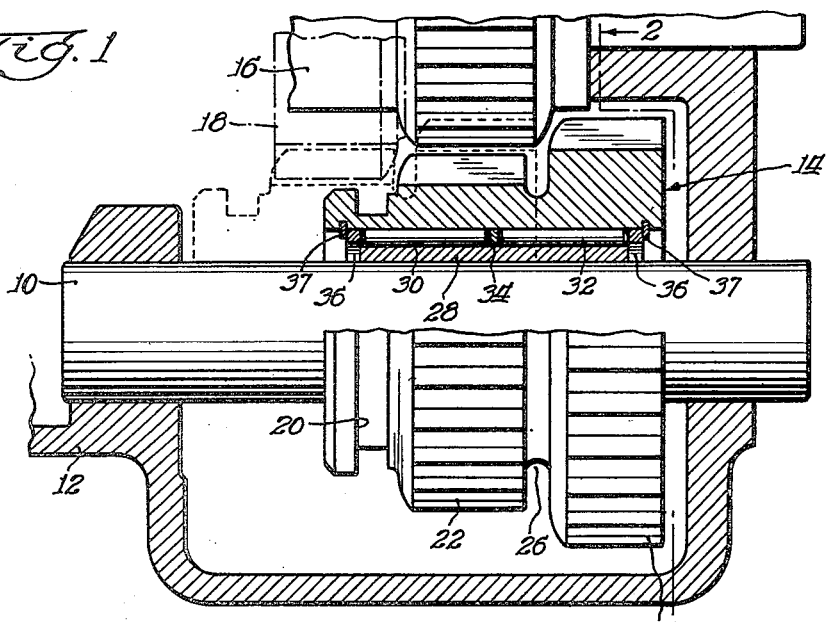
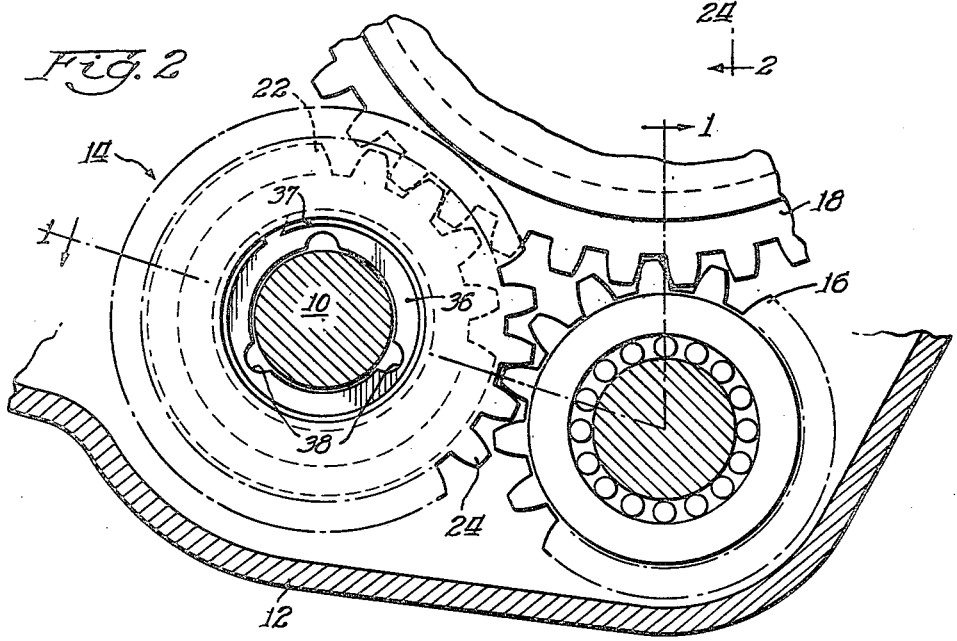
Inventor:
Edward S. Russey Patented Aug. 31, 1954

2,687,928

UNITED STATES PATENT OFFICE 2,687,928

TRANSMISSION IDLER GEAR CONSTRUCTION

Edward S. Russey, Muncie, Ind., assignor to Borg-Warner Corporation, Chicago, Ill., a corporation of Illinois Application April 29, 1950, Serial No. 158,954

4 Claims. (Cl. 308—187)

This invention relates to a machine element for the transmission of torque, and particularly to the construction and mounting means of a machine element which is slidably mounted on a shaft or the like.

In the past, difficulty has been encountered in the use of a machine element such as the reverse gear of a transmission, intended to utilize axially-spaced torque-transmitting and torque-receiving elements in which the machine element was mounted for axial movement to engage and disengage one or more of said torque transmitting and receiving elements. The difficulty has been due in a large measure to the tendency of the reverse idler gear to "creep" or move out of engagement due to the fact that the torque is transmitted tangentially at one end to the said reverse idler gear, creating a non-balanced load urging the idler gear out of alignment with respect to its shaft and the engaging teeth of the driving and driven gears. This tendency to creep out of engagement has been to a large measure overcome by the provision of an idler gear arrangement such as that set forth in Rovick Patent No. 2,401,192. However, in the Rovick construction there are certain objectionable features, mainly the construction of the sleeve on which the idler gear is mounted in a manner which requires special machining, thus increasing the cost. Further, the sleeve mounting as shown in the Rovick arrangement has certain other deficiencies, one of which is that the provision of a flange at the end thereof, in addition to increasing the cost by requiring machining, also provides an abutment for the idler gear, and the torque imparted to the idler gear is in part transmitted to the sleeve by reason of the friction between the idler gear and the flange of the sleeve, which friction is increased by the difficulty of lubricating the device properly.

It is a prime object of the present invention to remove the objectionable features referred to above, and mount the idler gear in such a manner that the tangential torque will be dissipated to some extent insofar as the sleeve is concerned; and will not have as great a tendency to urge the assembly out of engagement, thereby causing creep.

Another major factor forming an object of this invention is to provide better means for lubricating, that is, to facilitate lubrication of both surfaces of the sleeve, the surfaces of the bearing means, and the inner surface of the reverse idler gear, thus cutting down wear which would increase the tendency to creep, and also cutting down the friction which urges the assembly axially along the shaft.

Another object of the present invention is to provide an assembly utilizing parts which may be formed without any special machining, and which are adapted for greater ease in assembly and cheapness in construction.

Other objects, uses and features of the present invention will be more apparent from the following detailed description, when taken together with the accompanying drawing in which:

Fig. 1 is a fragmentary side elevational view, partly in cross-section, in which the reverse idler assembly is shown positioned out of engagement with the driving and driven gears intended for mating therewith;

Fig. 2 is a view taken on the line 2—2 of Fig. 1 looking in the direction of the arrows, and showing in particular the thrust washer arrangement and design.

Referring more in detail to the drawings, there is provided a stub shaft 10 mounted in a housing 12 and having thereon an axially slidable idler gear assembly 14. There is provided a driving gear 16, shown fragmentarily, and a driven gear 18, likewise shown fragmentarily, which are shown as engaging the idler gear in Fig. 2, and in the dotted line position of Fig. 1, and disengaged in the full line position of Fig. 1. It will be appreciated that either of these gears could be a driving gear or a driven gear, but I have here shown the customary arrangement as illustrative of the arrangement ordinarily used for operating a reverse idler gear for a transmission.

The idler gear is ordinarily shifted axially on the stub shaft 10 by means of a shift fork or the like (not shown) which fits into the usual groove 20 on the idler gear 14. Since this arrangement is ordinary it is not believed necessary to illustrate it herein.

As shown in Fig. 1, the driving gear 16 engages the gear portion 22, which is reduced in size, of the idler gear assembly 14. The gear portion 22, for ruggedness and ease of manufacture, and for the purpose of eliminating expense, is integral with the gear portion 24, here shown as the enlarged gear portion, of the idler gear 14. As illustrated in the drawing, the gear portions 22 and 24 have a "necked down" portion 26 therebetween, in the form of a groove. This is more or less standard where there are two gears which are integral, and has some advantages in the manufacture and in assuring clearance before engagement with mating gears.

As shown in the drawings, the idler gear assembly 14 is mounted on a sleeve or bushing 28 which is tubular and of substantially uniform cross section, and is in turn mounted on the stub shaft 10 for rotary and axial movement thereon. It will be noted that this sleeve is of the simplest possible construction. Its outer surface forms the bearing surface for needle bearings 30 and 32, here shown as being two sets of needle bearings mounted between the outer surface of the sleeve 28 and the inner surface of the idler gear and providing additional bearing and friction eliminating means for the idler gear. There is a spacer 34 between the series of needle bearings 30 and 32, which spacer assists in the alignment of the needle bearings.

At each end of the sleeve 28 there is provided a thrust washer 36 which is situated between the stub shaft 10 and the inner surface of the idler gear. The clearance between the thrust washer 36 and the shaft 10 is exaggerated in the drawing for purposes of clarity while actually the thrust washer is carried by the gear and is in bearing engagement with the shaft. This thrust washer 36 spaces the idler gear from the stub shaft, and assists in maintaining the alignment of the idler gear with respect to the stub shaft, the sleeve 28, and also the roller or needle bearings 30 and 32. The thrust washer 36 is in turn retained in place by snap rings 37 carried in a groove in the internal surface of the idler gear.

The thrust washers 36 are provided with the recesses or cut-outs 38, preferably on the inner circumference thereof and preferably extending radially to open both the inner and outer surfaces of the sleeve 28 to access of lubrication, there usually being three or more of said recesses. The principal purpose of these recesses is to provide passageways for lubricant to reach the inner surface of the sleeve 28, and the outer surface of said sleeve, the needle bearings, and the inner surface of the idler gear. It will thus be seen that the provision of such recessed thrust washers at each end abutting the sleeve permits the lubricant to reach all of the friction surfaces. Another feature that will be noted is that the thrust washers will absorb and counter any tendency of the idler gear assembly to move out of alignment due to the tangential torque thereon at either end, and if the axial thrust on the thrust washers is not uniform, there will be a tendency of the thrust washers to bind on the shaft and thus prevent the idler gear assembly from moving lengthwise out of engagement with the driving and driven gears.

Thus in operation, in the position shown in Fig. 1, the idler gear assembly is merely free on the shaft, and is not in engaged position. This lessens the wear on the bearings and parts, and removes the load of the idler gear from the prime mover. If it is desired to engage the idler gear, such as for reverse, it is shifted axially along the shaft 10, and the gear 22 engages the driving gear 16 at the same time the gear 24 engages the driven gear 18. The arrangement indicated will provide a better lubrication therefor than prior constructions.

One feature which is mentioned, but should be stressed, is the fact that standard parts are used in the assembly. The assembly may be made quickly and easily by inexperienced persons, and a specially machined idler shaft sleeve is not required.

While I have herein shown and described a certain embodiment of my invention, it is to be understood that the scope of this invention is not necessarily to be limited to the embodiment shown herein, but is to be determined by the appended claims.

I claim:

1. In combination, a rotatable element, a shaft, and a mounting for the element which permits the element to rotate about and be shifted axially along said shaft, said mounting comprising rollers for supporting the element, a sleeve bushing of substantially uniform cross-section throughout for supporting the rollers, said bushing being carried by said shaft and being axially slidable thereon, axial thrust receiving means separate from said bushing carried by said shaft and positioned at each end of said bushing and adapted to retain said bushing and rollers in assembled relation, and said thrust receiving means comprising thrust washers having lubricating openings whereby lubricant is admitted to all surfaces of said bearing and bushing means.

2. A machine element comprising an idler gear, a shaft means on which said idler gear is mounted for rotary and axial movement, a sleeve bushing of substantially uniform cross-section throughout between said shaft and said idler gear, said sleeve being adapted for rotary and axial movement on said shaft, bearing means between said sleeve and said idler gear, thrust receiving means at each end of said sleeve and adapted to retain said sleeve, bearing means and idler gear in assembled relation for operation as a unit, and lubricant admitting means in said thrust receiving means opening directly into the areas above and below the surfaces of said sleeve whereby lubricant is admitted to said sleeve, bearing and idler gear.

3. In combination, an idler gear, shaft means on which said idler gear is mounted, a sleeve bushing between said shaft and said idler gear, roller bearing means between said sleeve and said idler gear, a thrust washer carried directly on said shaft at each end of said sleeve and adapted to retain said sleeve and roller bearing means in assembled relation, means retaining said thrust washers in position adjacent each end of the sleeve, and lubricant-admitting recesses in said thrust washers opening directly into the areas above and below the surfaces of said sleeve whereby lubricant is introduced between said sleeve and said shaft and into the space between the sleeve and the idler gear occupied by the roller bearing means.

4. Mounting means for an idler gear and the like, comprising a shaft, a tubular sleeve mounted on said shaft and free to rotate thereon, and move axially thereon, bearing means on said sleeve, an idler gear on said bearing means, a thrust washer abutting each end of said sleeve and carried by said shaft, said thrust washer having lubricant-admitting openings of greater radial depth than the thickness of said sleeve whereby lubricant is admitted to all surfaces of said sleeve, said thrust washers being adapted to retain said bearing means against axial movement on said sleeve, and snap rings carried by said idler gear and retaining said thrust washers in position against the ends of said sleeve.

References Cited in the file of this patent

UNITED STATES PATENTS

| Number | Name | Date |
|--------|------|------|
| 683,772 | Kempster | Oct. 1, 1901 |
| 1,174,952 | Adam | Mar. 14, 1916 |
| 1,724,902 | Bentley | Aug. 20, 1929 |
| 2,192,088 | Lewis | Feb. 27, 1940 |
| 2,401,192 | Rovick | May 28, 1946 |